United States Patent [19]

Vaughn

[11] Patent Number: 4,726,628
[45] Date of Patent: Feb. 23, 1988

[54] PROTECTION VALVE DEVICE FOR SPRING PARKING BRAKE SYSTEMS

[75] Inventor: Lawrence Vaughn, Watertown, N.Y.

[73] Assignee: General Signal Corporation, Stamford, Conn.

[21] Appl. No.: 935,992

[22] Filed: Nov. 28, 1986

[51] Int. Cl.[4] .......................... B60T 7/12; B60T 13/00
[52] U.S. Cl. ........................................ 303/63; 303/66; 303/71; 303/86
[58] Field of Search ................ 303/6 M, 14, 57–67, 303/84, 69, 68, 71, 72–83, 86, 33, 35, 28; 188/170; 137/107, 87, 627.5, 102

[56] References Cited

U.S. PATENT DOCUMENTS

| | | | |
|---|---|---|---|
| 1,792,895 | 2/1931 | Cowlishaw | 303/63 |
| 2,318,798 | 5/1943 | Piron | 303/63 |
| 4,019,525 | 4/1977 | Horowitz | 303/28 X |
| 4,033,029 | 7/1977 | Spalding | 303/2 |
| 4,127,308 | 11/1978 | McEathron | 303/35 |
| 4,474,412 | 10/1984 | Schmitt | 303/63 X |
| 4,653,812 | 3/1987 | Engle | 303/33 |

Primary Examiner—Douglas C. Butler
Attorney, Agent, or Firm—Robert R. Hubbard; Harold Wynn

[57] ABSTRACT

A protection valve device for a spring parking brake control system has a pipe bracket for connection in a normally pressurized brake pipe, the pipe bracket having connected thereto a protection valve, a charging reset valve and a charging check valve. The protection valve has a chamber at one side of a piston normally pressurized by pressure at a spring parking brake cylinder port and monitors the spring parking brake cylinder pressure to vent fluid from the brake pipe to automatically cause an emergency brake application if such pressure indicates a spring parking brake is applied. The charging reset valve prevents the venting of brake pipe fluid during charging of the brake pipe and spring parking brake system.

16 Claims, 1 Drawing Figure

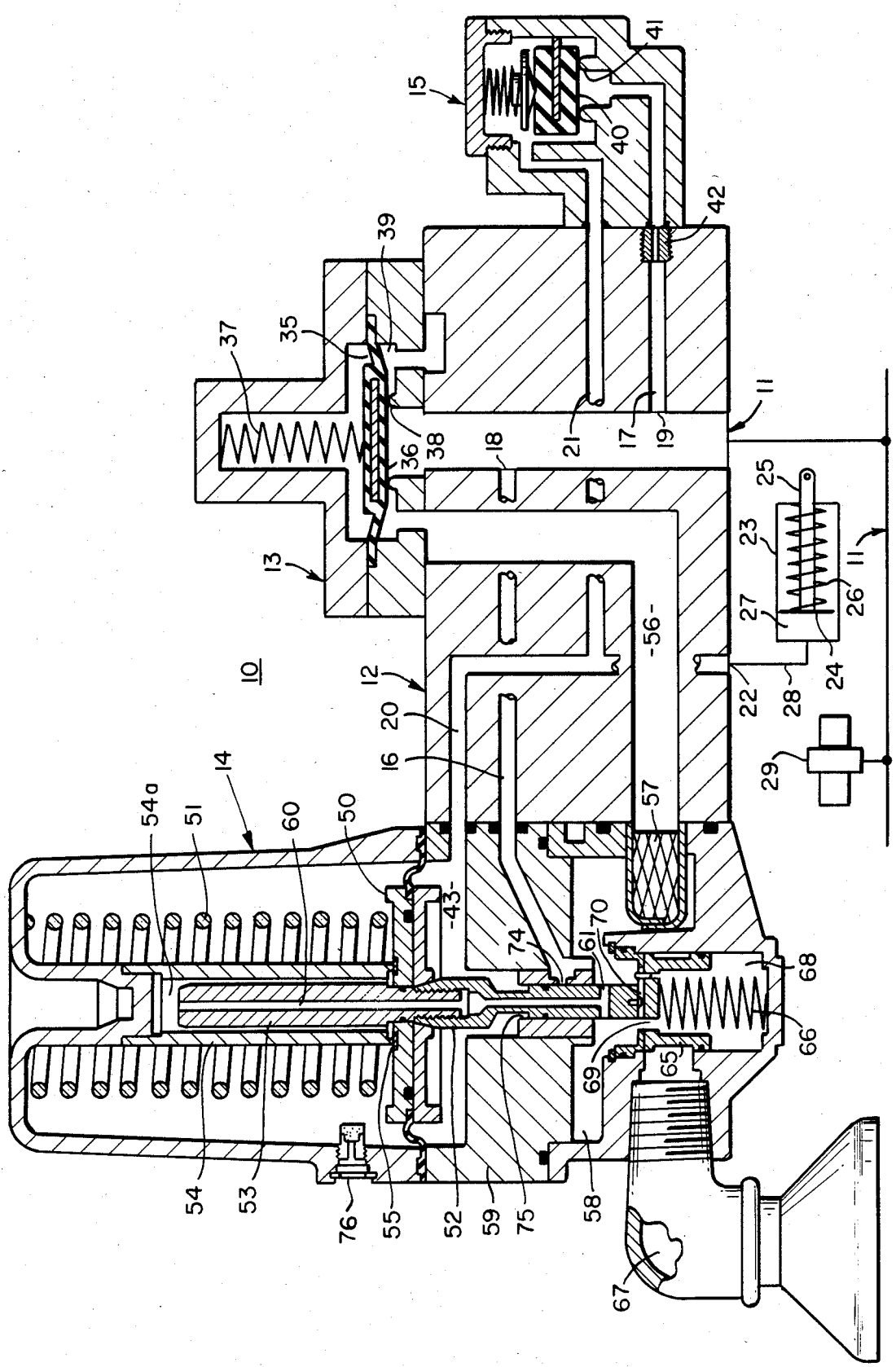

PROTECTION VALVE DEVICE FOR SPRING PARKING BRAKE SYSTEMS

BACKGROUND OF THE INVENTION

This invention relates to fluid railway brake control systems, and it more particularly relates to protection valve devices for such systems having spring parking brake cylinders.

Such a system is disclosed, for example, in the Spalding U.S. Pat. No. 4,033,629, granted July 5, 1977, wherein a conventional brake control system has a normally pressurized brake pipe, a control valve device with auxiliary and emergency reservoirs and a brake cylinder to control brakes of a brake rigging according to usual practice. In addition to this system, a spring parking brake cylinder is disclosed, together with a cut-out valve for preventing the contemporaneous activation of both the spring parking brake cylinder and the normal fluid pressure cylinder.

A problem arises in such a system that a parking brake may be inadvertently applied without detection by locomotive personnel, as by leakage of release fluid from a spring parking brake cylinder, causing an automatic application of the parking brakes, unnecessary wear of the brake shoes and perhaps creating a dangerous condition if this condition goes undetected in the operation of a train.

An object of the present invention is to provide a spring parking brake control system having a protection valve device which substantially obviates one or more of the limitations and disadvantages of the described prior systems.

Another object of the present invention is to provide a protection valve device for automatically indicating to a trainman that a spring parking brake may be applied in a train.

Another object of the present invention is to provide a protective valve device for sensing that a spring parking brake is applied and automatically causing an emergency brake application by venting the brake pipe.

SUMMARY OF INVENTION

A protection valve device is provided for connection in a normally charged brake pipe having a protection pipe bracket for connection in the brake pipe, which has a charging reset valve connected thereto for governing venting of brake pipe fluid from a vent port of the protection pipe bracket, a protection valve secured to the protection pipe bracket for governing the venting of brake pipe fluid from a port of the charging reset valve and a charging check valve. The protection pipe bracket has passages for connection of the protection valve and the charging check valve to a spring parking brake cylinder port.

For a better understanding of the present invention, together with other and further objects thereof, reference is had to the following description taken in connection with the accompanying drawing, while its scope will be pointed out in the appending claims.

DRAWING

The drawing is a schematic illustration, partly in cross-section, of a preferred embodiment of a protection valve device for use in connection with a spring parking brake cylinder.

With reference to the drawing, a protection valve device 10 is provided for connection in a normally charged brake pipe 11 having a pipe bracket 12 with a charging reset valve 13 connected thereto. A protection valve 14 is illustrated as being connected to the left hand side of the pipe bracket 12, and a charging check valve 15 is illustrated as being connected at the right hand end of the pipe bracket 12. The pipe bracket 12 has passages 16 and 17 therein which connect with ports 18 and 19 respectively of the brake pipe 11 to supply brake pipe pressure to the protection valve 14 and the charging check valve 15 respectively. Passages 20 and 21 are formed in the pipe bracket 12 for connection of the protection valve 14 to a charging check valve 15 and to a spring parking brake cylinder port 22.

A spring parking brake cylinder 23 contains a piston 24 connected to a parking brake rod 25 normally compressing a spring 26 by pressure in a chamber 27 obtained from a spring parking brake port 22 over passage 28. The spring parking braking cylinder 23 is illustrated in its normal position for releasing brakes of a brake rigging (not shown) that would be connected to the right hand end of the brake rod 25.

A control valve device 29, together with emergency and auxiliary reservoirs as disclosed, for example, in the prior McEathron U.S. Pat. No. 4,127,308, granted Nov. 28, 1978, or in the prior Engle U.S. application Ser. No. 776,763, filed Sept. 16, 1985, now U.S. Pat. No. 4,653,812, is connected to the brake pipe 11.

In considering the structure of the protective valve device 10 more specifically, the charging reset valve 13 is preferably formed as a part of the pipe bracket 12 having a diaphragm 35 forming a valve seat 36 that seals a passage from the brake pipe to the protection valve before charging of the brake pipe 11 by being biased by a spring 37 against an annular seat 38, which is shown as sealing off the brake pipe 11 from a chamber 39 below the diaphragm 35. The force of spring 37, together with the area exposed to the brake pipe pressure beneath the diaphragm 35 is such that the valve 13 is opened by a brake pipe pressure of substantially 60 psi. Thus the charging reset valve 13 remains closed upon charging of the brake pipe 11 until it is nearly fully charged. Upon opening, the charging reset valve exposes the larger area 39 to brake pipe pressure, which maintains the charging reset valve 13 open during normal service application and release brake pipe pressure variations.

The check valve 15 is illustrated as having a seal 40 against an annular seat 41 that permits passage of fluid from the brake pipe through port 19, passage 17, choke 42 and through passage 21 to the spring parking brake port 22 and through passage 20 to the protection valve 14. This permits charging of the chamber 43 of protection valve 14 and chamber 27 of the spring parking brake cylinder 23, but prevents discharge of fluid to the brake pipe when the brake pipe pressure drops below normal as in an emergency brake application.

The protection valve 14 comprises a piston 50 for sensing pressure at a brake pipe port 19 and at a spring parking brake port 22. A protection graduating spring 51 acts on the upper side of the piston 50, and a spool charging valve 52 is connected on the lower side of the piston 50 for initially supplying fluid pressure from a brake pipe port 18 through passage 16, a port 74 and spool valve 52 recess 75 to the chamber 43 beneath piston 50. This passage is closed off as the piston 50 moves upwardly, compressing spring 51, and further movement of the piston 50 is dependent upon brake pipe pressure applied from port 19 through the choke 42, passage 21, and passage 20 to the chamber 43, thus providing a bypass passage for further charging of the chamber 43 as brake pipe pressure increases after the spool valve 52 has been closed as the piston 50 rises through its initial stage.

As the brake pipe 11 charges, the piston 50 rises against the force of spring 51, the spring 51 having a force to drive the piston 50 downwardly when pressure falls below approximately 40 psi at the spring parking brake port 22. The spool 52 has a coaxial portion 53 extending above the piston 50, within a tube 54, the lower end of which seals against the piston at 55 to form a closed chamber within the spring 53, above the piston 50 that is normally vented to atmosphere via a choke 76.

After initial charging of the brake pipe 11 to a nominal 60 psi, the charging reset valve 13 is opened to permit passage of brake pipe fluid through a passage 56, and a filter 57 to a chamber 58 below a fixed portion of a housing 59 of the protection valve 14. The spool valve 52 and extension 53 has an axial passage 60 that is connected to chamber 58 through a passage 61 so that brake pipe pressure is applied within the chamber 54a contained by the tube 54.

A piston 65 serves as a vent valve and is coaxial with the spool valve 52 of the protection valve 14. The piston 65 is normally biased by a spring 66 to a closed position to prevent passage of fluid through a vent chamber 67 to atmosphere. A chamber 68 below the piston 65 is connected through a passage 69 to the chamber 58 in the protection valve 14 to equalize fluid pressures on both sides of the piston 65. With the protection valve piston 50 in its upper position as illustrated in the drawing, the spool valve 52 bears against the piston 65 at its lower end so that the downward movement of the protection piston 50 is effective to actuate the piston valve 65 downwardly to open the vent valve piston 65 and exhaust fluid from the brake pipe 11 to atmosphere.

OPERATION

CHARGING

With no fluid pressure in the brake pipe or in any of the various chambers, including the chamber 27 in the spring parking brake cylinder 23, the protection valve 14 is actuated to its lower position by the graduating spring 51, and the lower end of the spool valve 52 contacts the piston 65 at the point 70 and depresses the piston 65 so that the vent valve 65 is open.

To charge the system, fluid pressure is applied to the brake pipe 11, which charges the control valve device 29 and its associated reservoirs (not shown).

At this time, with the protection piston 50 in its lower position, the spool valve 52 opens a passage for the initial charging of the chamber 43 beneath the protection piston 50 from the brake pipe port 18 through passage 16 and a port 74 through a recess 75 in the spool valve 52 to the chamber 43 and from there through passage 20 and port 22 over passage 28 to chamber 27 of the spring parking brake cylinder 23. At the same time, a bypass charging circuit is open from port 19 of the brake pipe through choke 42 and check valve 15 to passage 21, and through passage 20 to chamber 43 beneath the protection piston 50 and to chamber 27 in the spring parking brake cylinder 23. As the protection piston 50 rises, the initial charging passage 16 is cut off by the spool valve 52, and the protection piston 50 continues to rise because of chamber 43 being charged through the bypass passage to the brake pipe including the choke 42 to control the rate of charge.

As the spool valve 52 moves upwardly, the vent piston 65 follows the spool valve 52 and closes a passage to chamber 67 and atmosphere.

When the brake pipe has become charged to a nominal 60 psi pressure, the charging reset valve 13 opens permitting brake pipe fluid to flow into passage 56, and from there into the chamber 58 of the protection valve 14. If the spring parking brake cylinder 23 has not been charged above a nominal pressure of 40 psi at the time when the charging reset valve 13 has been opened, the brake pipe 11 is vented to atmosphere through the vent valve 65 and chamber 67 to initiate an emergency application of the brake system as an indication that the spring parking brakes have not been released. If, however, the chamber 43 beneath the protection piston 15 has been charged above a nominal 40 psi, the protection valve 14 permits the vent valve 65 to be closed, thus preventing the venting of fluid when the charging reset valve 13 is opened.

SERVICE AND EMERGENCY APPLICATION AND RELEASE

The protection valve device 10 remains in its normal reset condition as has been described during service application and release in that the brake pipe 11 pressure remains at a level above nominal 28 psi to hold the charging reset valve 13 open and maintain the protection valve 14 in its normal reset condition.

When there is an emergency application, the brake pipe 11 pressure goes to zero, and thus the charging reset valve 13 is closed, but the chamber 43 beneath protection piston 15 and the chamber 27 in the spring parking brake cylinder 23 both remain at normal pressure because the charging check valve 15 prevents these chambers from discharging into the brake pipe 11. The charging reset valve 13 is preferably adjusted so that it opens on a pressure in the brake pipe of substantially 60 psi as described, and because of a larger area 39 beneath the diaphragm 35 being exposed after the valve has opened, the valve 13 remains open until the brake pressure drops substantially to 28 psi., which allows brake pipe pressure at the protection valve 14 to follow service reduction and recharges of the brake pipe 11.

PROTECTION FEATURE

If pressure in the spring parking brake cylinder chamber 27 is reduced to nominally 40 psi during normal operation of the brake system, either due to train brake-in-two or other failure condition, the protection valve 14 senses the low pressure condition of the spring parking brake cylinder and an emergency brake application is initiated by the piston 50 being driven downwardly to open the vent valve 65 and vent fluid from the brake pipe 11 through the charging reset valve 13, passage 56, chamber 58, and passage 67 to atmosphere. This sharp reduction in brake pipe pressure is effective to cause the control valve device 29 to initiate an emergency brake application along with other similar control valves throughout a train. Once the spring 51 has opened a seal at 55 at the lower end of tube 54, the brake pipe pressure is applied to the entire top of the piston 50 through the passage 60 of the spool valve to cause the protection valve 14 to have snap action in opening the vent valve 65. This stops the train and indicates to the trainman that a failure in the spring parking brake system may have occurred.

Having thus described a protection valve device for a spring parking brake system as a preferred embodiment of the present invention, it is to be understood that various modifications and alterations may be made to the specific embodiment shown, without department from the spirit or scope of the invention.

I claim:

1. A protection valve device for connection in a normally charged brake pipe comprising;
   (a) a brake pipe bracket for connection in a brake pipe having charging reset valve means connected thereto for governing venting of fluid from a vent brake pipe port of the pipe bracket,
   (b) protection valve means secured to the pipe bracket for governing the venting of fluid from a port of the charging reset valve means,
   (c) charging check valve means secured to the pipe bracket having a port for delivery of brake pipe fluid to the protection valve means,
   (d) the pipe bracket having passages and ports for connection of the brake pipe to the protection valve means and the charging check valve means respectively, and
   (e) the pipe bracket having passages for connection of the protection valve means and the charging check valve means to a spring parking brake cylinder port.

2. A protection valve device according to claim 1 wherein the charging reset valve means is integral with the pipe bracket.

3. A protection valve device according to claim 1 wherein the protection valve means senses reduced pressure at the spring parking brake port for venting the brake pipe if the brake pipe is normally pressurized.

4. A protection valve device according to claim 3 wherein the charging reset valve means prevents the venting of the brake pipe by the protection valve means when the brake pipe is being charged.

5. A protection valve device according to claim 4 wherein the protection valve means comprises;
   (a) a piston for sensing pressure at a brake pipe port and at a spring parking brake port,
   (b) a protection graduating spring acting on one side of the piston,
   (c) spool charging valve means connected to the piston for initially supplying fluid pressure from a brake pipe when it is being charged to a protection chamber for acting on the piston in opposition to the protection graduating spring, the spool charging valve means being closed after initial movement of the piston as brake pipe pressure increases, and
   (d) bypassing passage means for bypassing the spool charging valve means for further pressurization of the protection chamber to continue movement of the piston in opposition to the protection graduating spring as brake pressure continues to increase until pressure in the protection chamber is substantially at normal brake pipe pressure.

6. A protection valve device according to claim 5 wherein the bypass passage means includes a choke and a charging check valve.

7. A protection valve device according to claim 5 wherein the protection valve means monitors pressure at the spring parking brake cylinder port and has vent valve means actuated by the graduating spring to vent the brake pipe when pressure at the spring parking brake port drops materially below normal brake pipe pressure.

8. A protection valve device according to claim 7 wherein the vent valve means comprises a piston vent valve actuated by the spool charging valve means.

9. A protection valve device according to claim 7 wherein the spool charging valve means has a portion extending in a tube chamber coaxial with the protection graduating spring, the spool charging valve means having an axial passage supplying brake pipe pressure to the tube chamber to assist in actuating the piston means in response to low pressure at the spring hand brake port.

10. A protection valve device according to claim 9 wherein the tube chamber is normally closed against the piston, but is open to a larger area of the piston when the piston starts to leave its normal position to provide snap action for quickly opening the vent valve means.

11. A protection valve comprising;
    (a) a piston for sensing pressure at a brake pipe port and at a spring parking brake port,
    (b) a protection graduating spring acting on one side of the piston,
    (c) spool charging valve means connected to the piston for initially supplying fluid pressure from a brake pipe when it is being charged to a protection chamber for acting on the piston in opposition to the protection graduating spring, the spool charging valve means being closed after initial movement of the piston as brake pipe pressure increases, and
    (d) bypassing passage means for bypassing the spool charging valve means for further pressurization of the protection valve chamber from the brake pipe to continue movement of the piston in opposition to the protection graduating spring as brake pipe pressure continues to increase until pressure in the chamber is substantially at normal brake pipe pressure.

12. A protection valve according to claim 11 wherein the bypass passage means includes a choke and a charging check valve.

13. A protection valve according to claim 11 wherein the protection valve monitors pressure at a spring hand brake cylinder port and has vent valve means actuated by the graduating spring to vent the brake pipe when pressure at the spring hand brake cylinder port drops materially below normal brake pipe pressure.

14. A protection valve according to claim 13 wherein the vent valve means comprises a piston vent valve actuated by the spool charging valve means.

15. A protection valve according to claim 13 wherein the spool charging valve means has a portion extending in a tube chamber coaxial with the protection graduating spring, the spool charging valve means having a coaxial passage supplying brake pipe pressure to the tube chamber to assist in actuating the piston in response to low pressure at a spring hand brake cylinder port.

16. A protection valve according to claim 15 wherein the tube chamber is normally closed against the piston, but is open to a larger area of the piston when the piston starts to leave its normal position to provide snap action for quickly opening the vent valve means.

* * * * *